United States Patent
Bose et al.

(10) Patent No.: US 10,686,639 B2
(45) Date of Patent: *Jun. 16, 2020

(54) METHOD AND SYSTEM FOR COMPRESSED SENSING JOINT CHANNEL ESTIMATION IN A CELLULAR COMMUNICATIONS NETWORK

(71) Applicant: Collision Communications, Inc., Peterborough, NH (US)

(72) Inventors: Sayak Bose, Nashua, NH (US); Brandon Hombs, Merrimack, NH (US); Sagar Dhakal, Bedford, NH (US); Joseph Farkas, Merrimack, NH (US)

(73) Assignee: Collision Communications, Inc., Peterborough, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/434,589

(22) Filed: Jun. 7, 2019

(65) Prior Publication Data

US 2019/0312767 A1 Oct. 10, 2019

Related U.S. Application Data

(63) Continuation of application No. 16/244,064, filed on Jan. 9, 2019, now Pat. No. 10,333,761, which is a
(Continued)

(51) Int. Cl.
*H04L 27/26* (2006.01)
*H04B 7/0452* (2017.01)
(Continued)

(52) U.S. Cl.
CPC ......... *H04L 27/2671* (2013.01); *H04B 7/024* (2013.01); *H04B 7/0452* (2013.01);
(Continued)

(58) Field of Classification Search
CPC .. H04W 88/06; H04L 5/0005; H04L 27/2671; H04L 25/0202; H04L 25/0204;
(Continued)

(56) References Cited

U.S. PATENT DOCUMENTS

| 9,755,714 | B2 | 9/2017 | Bose et al. |
| 10,333,761 | B2* | 6/2019 | Bose ............... H04L 25/0202 |
| 2005/0249181 | A1 | 11/2005 | Vijayan et al. |
| 2009/0154625 | A1 | 6/2009 | Kwak et al. |

(Continued)

OTHER PUBLICATIONS

USPTO, Final Office Rejection in U.S. Appl. No. 14/583,076 dated Jan. 25, 2017.
(Continued)

*Primary Examiner* — Sung S Ahn
(74) *Attorney, Agent, or Firm* — NK Patent Law

(57) ABSTRACT

Methods and systems for performing compressed time domain joint channel estimation in a multi-user MIMO wireless network include receiving data corresponding to transmission of training signals from a plurality of users to a base station over a MIMO wireless network, determining a limited data set by limiting the received data in a time domain according to an estimated maximum delay spread, forming a well-conditioned low rank training matrix by identifying a channel model, estimating an active tap from the formed well-conditioned low rank training matrix, and subtracting a contribution of the selected active tap from the limited data set.

34 Claims, 3 Drawing Sheets

Related U.S. Application Data continuation of application No. 15/668,638, filed on Aug. 3, 2017, now Pat. No. 10,277,446, which is a continuation of application No. 14/583,076, filed on Dec. 24, 2014, now Pat. No. 9,755,714.

(51) Int. Cl.
  *H04B 7/024* (2017.01)
  *H04L 25/02* (2006.01)

(52) U.S. Cl.
  CPC ...... *H04L 25/0202* (2013.01); *H04L 25/0204* (2013.01); *H04L 25/0222* (2013.01); *H04L 25/0224* (2013.01)

(58) Field of Classification Search
  CPC . H04L 25/0222; H04L 25/0224; H04B 7/024; H04B 7/0452
  See application file for complete search history.

(56) References Cited

U.S. PATENT DOCUMENTS

| | | |
|---|---|---|
| 2010/0271931 A1 | 10/2010 | Cheng et al. |
| 2011/0286558 A1 | 11/2011 | Abrishamkar et al. |
| 2012/0182857 A1 | 7/2012 | Bertrand et al. |
| 2014/0204856 A1 | 7/2014 | Chen et al. |

OTHER PUBLICATIONS

USPTO, non-Final Office Rejection in U.S. Appl. No. 14/583,076 dated Jun. 23, 2016.
USPTO, Notice of Allowance in U.S. Appl. No. 14/583,076 dated Apr. 27, 2017.
USPTO, non-Final Office Rejection in U.S. Appl. No. 15/668,638 dated Sep. 7, 2018.
USPTO, Notice of Allowance in U.S. Appl. No. 15/668,638 dated Dec. 27, 2018.

* cited by examiner

METHOD AND SYSTEM FOR COMPRESSED SENSING JOINT CHANNEL ESTIMATION IN A CELLULAR COMMUNICATIONS NETWORK

RELATED APPLICATIONS

This application is a continuation of U.S. patent application Ser. No. 16/244,064, titled "Method and System for Compressed Sensing Joint Channel Estimation in an LTE Cellular Communications Network," filed on Jan. 9, 2019, which is continuation of U.S. patent application Ser. No. 15/668,638, titled "Method and System for Compressed Sensing Joint Channel Estimation in an LTE Cellular Communications Network," filed on Aug. 3, 2017, which is a continuation of U.S. patent application Ser. No. 14/583,076, titled "Method and System for Compressed Sensing Joint Channel Estimation in an LTE Cellular Communications Network," filed on Dec. 24, 2014, the entire disclosure of which is here incorporated by reference.

FIELD

The subject matter disclosed relates to telecommunications, and more particularly, to methods of channel estimation in a digital telecommunication network.

BACKGROUND

Channel estimation in a large scale Multiple Input Multiple Output ("MIMO") system is a very challenging task because of the increased dimensions and associated increased complexity that arises therefrom. A large scale multi user MIMO system includes a first plurality of antennae at the base station in communication with one or more receivers that can be single or multiple antenna mobile terminals.

Large scale MIMO communication can occur in cloud RAN (C-RAN) settings, where several collocated base stations are pooled together to form a single, virtual site with many antennae, typically much more than that number of users that are in communication with the site. The advantage to such a system model lies in the increased spatial dimension, whereby base stations can use the system on the uplink to jointly detect several users using simple linear detection methods such as matched filter, zero-forcing, or MMSE, so long as the channel estimate is sufficiently accurate. Similarly, on the downlink, the large number of antennae at the base station can be effectively used to "beam form" signals to targeted users.

Channel estimation is an important concern in this type of system. One approach is to perform channel estimation jointly for a plurality of users. So long as the system remains determined, this approach can provide improved channel estimation and increased efficiency as compared to single user channel estimation. However when using joint channel estimation the system can become under-determined as the number of users increases, so that it becomes impossible to accurately estimate all of the user channels jointly using conventional channel estimation algorithms such as block least squares.

One approach for dealing with underdetermined systems of this type is to use compressive sensing channel estimation. This approach is based on the idea that the number of degrees of freedom of the channel matrix is smaller than its large number of free parameters, so that a sufficiently low rank approximation of the channel matrix can be found which can be conveniently used to solve the channel estimation problem using any of several existing algorithms.

Recent efforts have attempted to solve this channel estimation problem in large scale multiuser MIMO systems by exploiting a prior knowledge of channel sparsity that originates from assuming a finite scattering model of the channel. However, it has been unclear how these compressed sensing channel estimation methods could be applied in a typical cellular communications network operating according to the Long Term Evolution, ("LTE") standard, especially when the network is operating in a C-RAN setting.

Large scale multi user MIMO is likely to be deployed within networks having a C-RAN architecture and operating according to the LTE standard. In this this type of architecture, the LTE systems are likely to be based on time division duplex ("TDD") communication. In TDD LTE systems, channel state information is estimated in the uplink based on Sounding Reference Signal ("SRS") training signals that are included in the uplink specifically for this purpose. Estimated channel reciprocity is then used to perform linear beam forming or precoding on the downlink. Using a comb pattern and careful cell ID selection, a relatively large number of users can be multiplexed to send SRS training signals in the uplink on the same sub-frame, as is required for large scale multi user MIMO communication.

As in many other wireless network environments, time domain least square joint channel estimation will be able to provide sufficiently accurate channel estimation for multi user MIMO LTE networks so long as the number of users remains less than the number of training signal observations. However, as the number of users in the system becomes more than the number of observations, the system will become undetermined, and the training matrix will become ill-conditioned. The result will be poor joint channel estimation, which will significantly impair the performance of the downlink beam forming and precoding that are based on the reciprocal of the channel estimations.

What is needed, therefore, is a method and system for implementing compressed sensing joint channel estimation in a multi user MIMO LTE network.

SUMMARY

Methods and systems for performing compressed time domain joint channel estimation in a multi-user MIMO wireless network include receiving data corresponding to transmission of training signals from a plurality of users to a base station over a MIMO wireless network, determining a limited data set by limiting the received data in a time domain according to an estimated maximum delay spread, forming a well-conditioned low rank training matrix by identifying a channel model, estimating an active tap from the formed well-conditioned low rank training matrix, and subtracting a contribution of the selected active tap from the limited data set.

According to an exemplary embodiment, a method is described of performing time domain channel estimation in a multi-user multiple input multiple output ("MIMO") wireless network. The method includes receiving data corresponding to transmission of training signals from a plurality of users to a base station over a MIMO wireless network, estimating a maximum delay spread for the received data according to a coherence bandwidth of the received data, determining a limited data set by limiting the received data in a time domain according to the estimated maximum delay spread, selecting and estimating an active tap from the limited data set, and subtracting a contribution of the selected active tap from the limited data set.

In some exemplary embodiments, the steps of selecting and estimating an active tap from the limited data set and subtracting a contribution of the selected active tap from the reduced data set is repeated until the residual signal norm falls below a specified minimum. And in various exemplary embodiments, a plurality of active taps are selected.

According to another exemplary embodiment, a system is described for performing time domain channel estimation in a multi-user multiple input multiple output ("MIMO") wireless network. The system includes a signal receiving unit configured to receive data corresponding to transmission of training signals from a plurality of users to a base station over a MIMO wireless network, and a signal processing unit configured to estimate a maximum delay spread for the received data according to a coherence bandwidth of the received data, determine a limited data set by limiting the received data in a time domain according to the estimated maximum delay spread, select and estimate an active tap from the limited data set, and subtract a contribution of the selected active tap from the reduced data set.

In some exemplary embodiments, the signal processing unit is configured to repeatedly subtract contributions of selected active taps from the reduced data set until the residual signal norm falls below a specified minimum. And in various exemplary embodiments, the signal processing unit is configured to select a plurality of active taps.

According to yet another exemplary embodiment, a non-transitory computer readable medium storing a computer program is described, the computer program being executable by a machine for performing time domain channel estimation in a multi-user multiple input multiple output ("MIMO") wireless network. The computer program includes executable instructions for receiving data corresponding to transmission of training signals from a plurality of users to a base station over a MIMO wireless network, estimating a maximum delay spread for the received data according to a coherence bandwidth of the received data, determining a limited data set by limiting the received data in a time domain according to the estimated maximum delay spread, selecting and estimating an active tap from the limited data set, and subtracting a contribution of the selected active tap from the reduced data set.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The accompanying drawings provide visual representations which will be used to more fully describe the representative embodiments disclosed here and can be used by those skilled in the art to better understand them and their inherent advantages. In these drawings, like reference numerals identify corresponding elements, and.

DETAILED DESCRIPTION

A method and system are described for implementing compressed sensing joint channel estimation of all the desired users (and interferers, if required) in a multi user MIMO network.

As noted above, frequency domain channel estimation is typically unable to fully capture the frequency selectivity of the channel because it lacks the required degrees of freedom due to the limited number of carriers that can be observed. Instead, the method and system described herein estimates the positions of only a small number of significant channel taps in the time domain for each user. In this way, the method essentially turns the underdetermined system into a stable, determined system where existing, robust algorithms such as L1-norm or L2-norm minimization-based equation solving can be applied to perform joint channel estimation.

Figure 1:
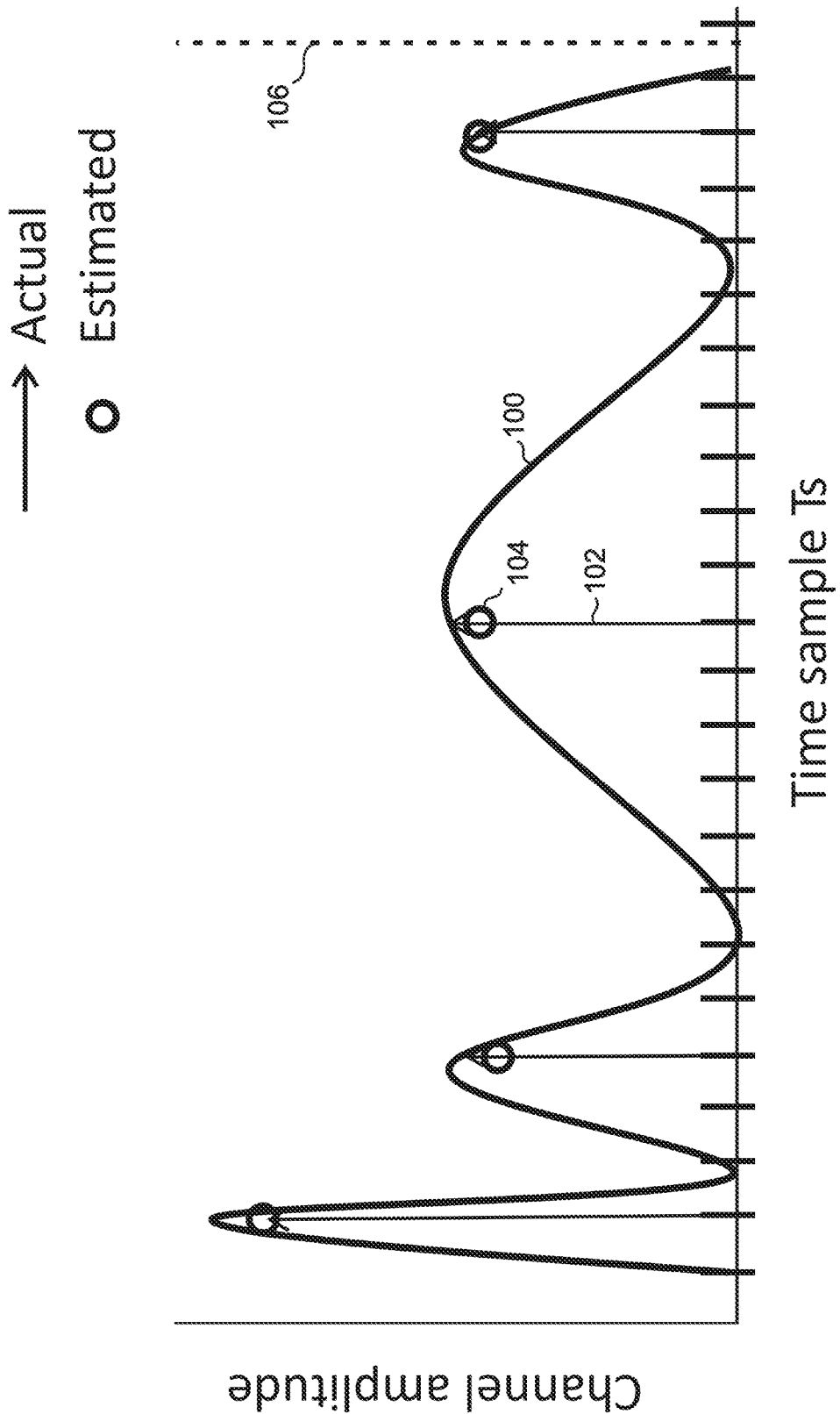
FIG. 1 is a graph showing a typical group of actual channel taps and the resulting SRS training signal as they might appear in the time domain due to discrete physical scattering of the SRS training signals.

With reference to FIG. 1, one important aspect of the disclosed method is estimation 104 from the received SRS signal 100 of the active channel taps 102 for each of the users, so that the sparsity of the multiuser uplink channel can be exploited to obtain robust channel estimates from training signals. Note that, while the description provided herein typically refers to the use of SRS signals for said estimation, it will be understood by those of ordinary skill in the art that the method described herein can also be applied to DMRS training signals.

In FIG. 1, a typical group of actual channel taps 102, and the resulting SRS training signal 100 as it is received by the base station, are shown as they might appear in the time domain due to discrete physical scattering of the SRS training signals. Compressed sensing-based channel estimation essentially detects the positions of the active channel taps, and then estimates them 104 using a channel matrix model that has a very low rank compared to the observation 100.

Figure 2:
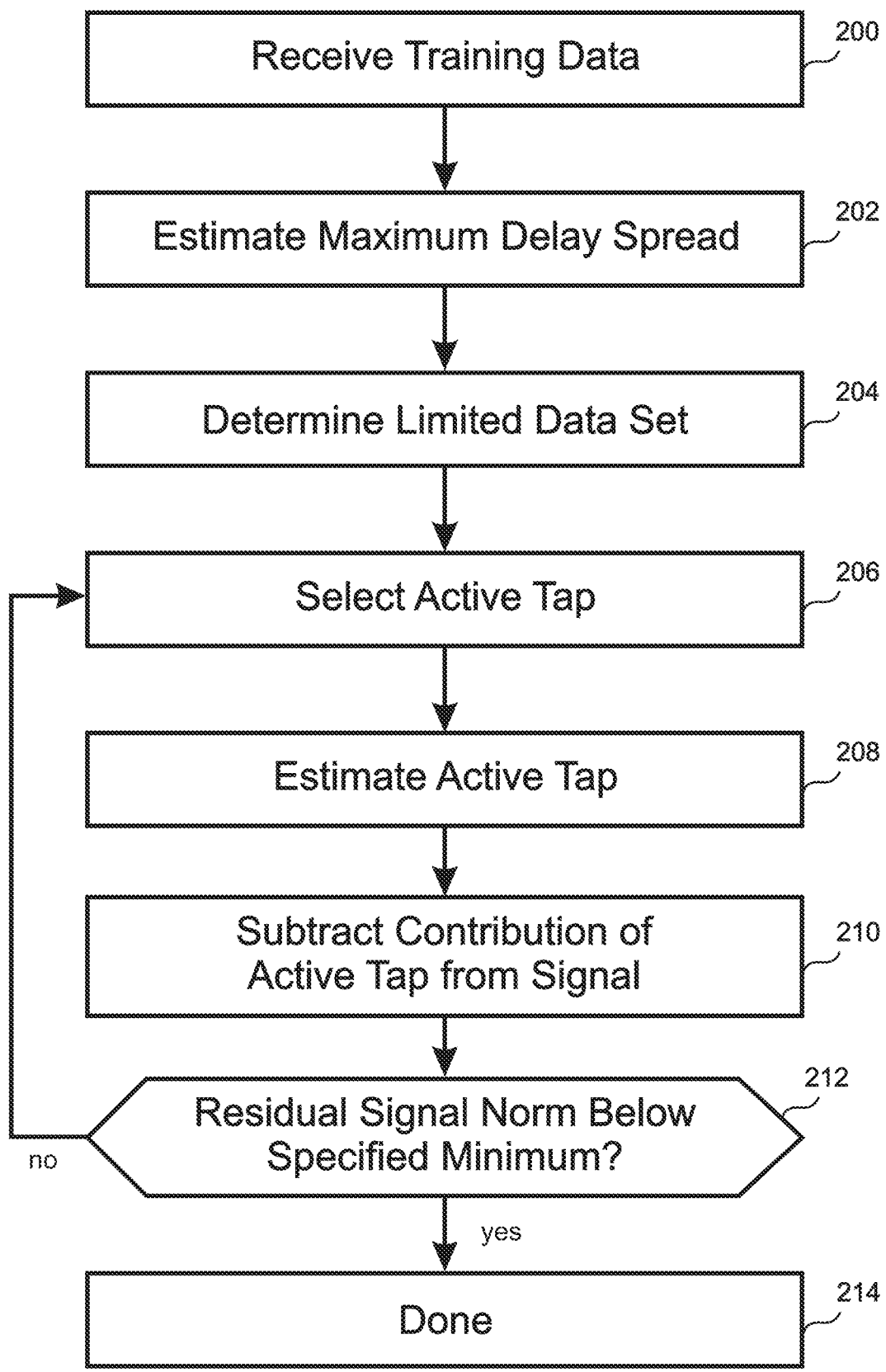
FIG. 2 is a flow diagram illustrating steps in an embodiment of the disclosed invention.

With reference to FIG. 2, in exemplary embodiments the following steps are performed:

Step 1: From the received 200 training signal data 100, using an estimate 202 of the maximum delay spread 106, and assuming a cyclic nature of the channel due to the properties of the Fourier transform, a limited data set for each user is determined 204 by considering only the training sample data 100 that falls within the maximum delay spread 106 and cyclic extensions thereof. Using only training sample data that is received during the maximum delay spread 106 is justified, because the maximum delay spread 106 can be estimated with reasonable accuracy from the coherence bandwidth of the received signal training 100. In this way the channel sparsity is well characterized inherently by the reduced set of time domain training samples 100, even though the exact channel sparsity for each user is not explicitly known.

Step 2: Using the reduced set of training signal data 100, active tap selection is performed using orthogonal matching pursuit, basis pursuit, or another, similar algorithm that selects 206 the active taps 102 by determining the time domain training sample that is most closely correlated in magnitude with the observed signal 100, and then estimates 208 an active channel tap 102 using existing l1-norm or l2-norm minimization methods. The contribution of the selected, active channel tap 102 is then subtracted 210 from the received signal 100, so that only a residual signal remains.

Step 3: The process described in step 2 is repeated 212 by applying it to the residual signal to identify and estimate an additional active channel tap, and to re-estimate all previously estimated and currently estimated active channel taps from the original received data.

In embodiments, Step 3 is repeated until all of the active taps of all the users in the received signals have been estimated, resulting in a residual signal norm that is smaller than a specified minimum value 214. In some embodiments, the process is made more efficient by grouping a plurality of the most strongly correlated channel taps and estimating them jointly, removing the contributions of all the taps in the group from the received data, and then repeat the process until all of the active taps have been estimated. It should be noted that not all of the active taps for all of the users will necessarily be time-aligned.

In embodiments, any of several l1-norm minimization methods with adjustable de-noising functions is used in the above process. These algorithms (e.g. NESTA or LASSO) inherently exploit the channel sparsity by iteratively solving a smoothed version of an l1-norm objective function that is constructed by parametric de-noising of an original l1-norm objective. Several classes of interior-point methods, which are of polynomial complexity, can then be applied to produce a solution.

It should be noted that the disclosed method exploits the channel sparsity implicitly, by estimating the significant channel taps over a reduced data set and by stopping the search after the power norm of the residual signal falls below a pre-determined threshold. For this reason, there is no need in the present method for prior knowledge of the channel sparsity. This is an advantageous feature of the present method, especially when it is applied to an LTE based C-RAN wireless communication network.

It should also be noted that the methods disclosed herein can be applied to determined and over-determined systems, although they may tend to be inherently more complex than typically applied methods. For this reason, application of the present methods to under-determined systems, such as large scale multi-user MIMO systems, is emphasized herein, because of the present method's ability to provide a performance advantage by exploiting the structure of the received training signals, and in particular by exploiting the channel sparsity contained in the training signals.

Figure 3:
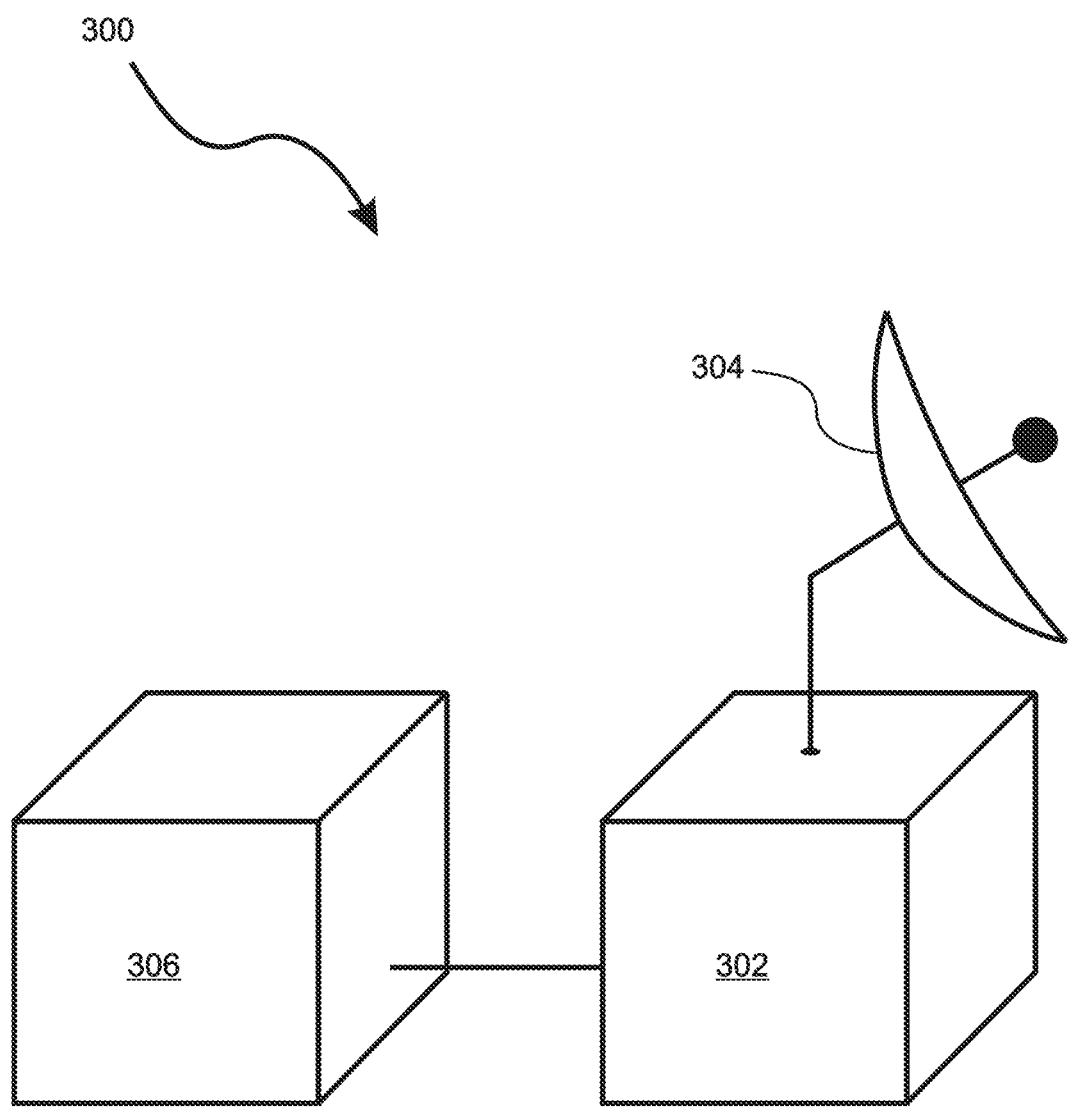
FIG. 3 is a block diagram illustrating an embodiment of the disclosed system.

With reference to FIG. 3, the system disclosed herein 300 includes a signal receiving unit 302 in communication with at least one antenna 304 and configured to receive training signals from a plurality of users, and a signal processing unit 306 configured to estimate a maximum delay spread for the received data according to a coherence bandwidth of the received data, determine a limited data set by limiting the received data in a time domain according to the estimated maximum delay spread, select and estimate an active tap from the limited data set, and subtract a contribution of the selected active tap from the reduced data set.

The signal processing unit 306 is an instruction execution machine, apparatus, or device and may comprise one or more of a microprocessor, a digital signal processor, a graphics processing unit, an application specific integrated circuit (ASIC), a field programmable gate array (FPGA), and the like. The signal processing unit 306 may be configured to execute program instructions stored in a memory and/or data storage (both not shown). The memory may include read only memory (ROM) and random access memory (RAM). The data storage may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide non-volatile storage of computer readable instructions, data structures, program modules and other data.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

The signal processing unit 306 and signal receiving unit 302 preferably detect and analyze transmissions from at least one or more remote nodes that operate in a networked environment using logical connections to one or more base stations ("BS's"). The remote node may be another BS, a user equipment ("UE"), a computer, a server, a router, a peer device or other common network node. The base station may interface with a wireless network and/or a wired network. For example, wireless communications networks can include, but are not limited to, Code Division Multiple Access (CDMA), Time Division Multiple Access (TDMA), Frequency Division Multiple Access (FDMA), Orthogonal Frequency Division Multiple Access (OFDMA), and Single-Carrier Frequency Division Multiple Access (SC-FDMA). A CDMA network may implement a radio technology such as Universal Terrestrial Radio Access (UTRA), Telecommunications Industry Association's (TIA's) CDMA2000®, and the like. The UTRA technology includes Wideband CDMA (WCDMA), and other variants of CDMA. The CDMA2000® technology includes the IS-2000, IS-95, and IS-856 standards from The Electronics Industry Alliance (EIA), and TIA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advance (LTE-A) are newer releases of the UMTS that use E-UTRA. UTRA, E-UTRA, UMTS, LTE, LTE-A, and GAM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. Other examples of wireless networks include, for example, a BLUETOOTH network, a wireless personal area network, and a wireless 802.11 local area network (LAN).

Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, signal processing unit 306 may include logic configured to support direct memory access (DMA) transfers between memory and other devices.

It should be understood that the arrangement illustrated in FIG. 3 is but one possible implementation and that other arrangements are possible. It should also be understood that the various system components (and means) defined by the claims, described above, and illustrated in the various block diagrams represent logical components that are configured to perform the functionality described herein. For example, one or more of these system components (and means) can be realized, in whole or in part, by at least some of the components illustrated in the arrangement of hardware device 300. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter disclosed, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. One of ordinary skill in the art should appreciate after learning the teachings related to the claimed subject matter contained in the foregoing description that variations of those preferred embodiments may become apparent to those of ordinary skill in the art upon reading the foregoing description. The inventor intends that the claimed subject matter may be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

We claim:

1. A method of performing time domain channel estimation in a multi-user multiple input multiple output ("MIMO") wireless network, the method comprising:
   receiving data corresponding to transmission of training signals from a plurality of users to a base station over a MIMO wireless network;
   determining a limited data set by limiting the received data in a time domain according to an estimated maximum delay spread;
   forming a well-conditioned low rank training matrix by identifying a channel model;

estimating an active tap from the formed well-conditioned low rank training matrix; and subtracting a contribution of the selected active tap from the limited data set.

2. The method of claim 1, wherein estimating an active tap from the formed well-conditioned low rank training matrix comprises:

selecting an active tap from the limited data set; and determining a number of active taps in the MIMO multi-user wireless network.

3. The method of claim 2, wherein the active tap is selected by at least one of orthogonal matching pursuit and basis pursuit.

4. The method of claim 2, wherein selecting an active tap includes selecting a plurality of active taps.

5. The method of claim 4, wherein the plurality of active taps is selected according to which active taps have the strongest correlation to the received training signal.

6. The method of claim 4, wherein for each user the plurality of active taps includes at least one active tap corresponding to that user.

7. The method of claim 2, wherein selecting an active tap from the limited data set comprises:

detecting active tap locations of the reduced data set; and selecting the active tap according to the estimated active tap locations.

8. The method of claim 7, wherein the active tap locations are detected using a matching pursuit algorithm.

9. The method of claim 7, wherein the active tap is selected by solving a l1/l2 norm minimization problem.

10. The method of claim 2, wherein selecting an active tap from the limited data set comprises applying a basis pursuit de-noising function associated with an l1-norm objective function to the reduced data set.

11. The method of claim 2, comprising repeating the steps of selecting and subtracting until a residual signal norm falls below a specified minimum.

12. The method of claim 1, wherein at least one of the training signals is a sounding reference signal ("SRS") signal.

13. The method of claim 1, wherein at least one of the training signals is a demodulation reference signal ("DMRS") signal.

14. The method of claim 1, wherein the MIMO wireless network is a cloud radio access network ("C-RAN") network.

15. The method of claim 1, wherein the network operates using at least one of time division duplexed ("TDD") and frequency division duplexed ("FDD") communications.

16. The method of claim 1, wherein the active tap is estimated using at least one of:

l1-norm minimization;

l2-norm minimization;

regulated L2-norm immunization;

OMP greedy matching pursuit; and stomp greedy matching pursuit.

17. A system for performing time domain channel estimation in a multi-user multiple input multiple output ("MIMO") wireless network, the system comprising:

a signal receiving unit configured to receive data corresponding to transmission of training signals from a plurality of users to a base station over a MIMO wireless network; and a signal processing unit configured to receive data corresponding to transmission of training signals from a plurality of users to a base station over a MIMO wireless network;

determine a limited data set by limiting the received data in a time domain according to an estimated maximum delay spread;

form a well-conditioned low rank training matrix by identifying a channel model;

estimate an active tap from the formed well-conditioned low rank training matrix; and subtract a contribution of the selected active tap from the limited data set.

18. The system of claim 17, wherein the signal processing unit is further configured to estimate an active tap from the formed well-conditioned low rank training matrix by:

selecting an active tap from the limited data set; and determining a number of active taps in the MIMO multi-user wireless network.

19. The system of claim 18, wherein the signal processing unit is further configured to repeatedly select the active tap and subtract the contribution until a residual signal norm falls below a specified minimum.

20. The system of claim 18, wherein the signal processing unit is configured to select the active tap by at least one of orthogonal matching pursuit and basis pursuit.

21. The system of claim 18, wherein the signal processing unit is configured to select a plurality of active taps.

22. The system of claim 21, wherein the signal processing unit is configured to select the plurality of active taps according to which active taps have the strongest correlation to the received training signal.

23. The system of claim 21, wherein the signal processing unit is configured to select the plurality of active taps such that, for each user, the plurality of active taps includes at least one active tap corresponding to that user.

24. The system of claim 18, wherein the signal processing unit is configured to select and estimate the active tap by:

determining a number of active taps in the wireless network;

identifying a channel model;

forming a well-conditioned low rank training matrix; and estimating the active tap from the low rank training matrix.

25. The system of claim 18, wherein the signal processing unit is configured to select the active tap by:

detecting active tap locations of the reduced data set; and selecting the active tap according to the estimated active tap locations.

26. The system of claim 25, wherein the signal processing unit is configured to detect the active tap locations using a matching pursuit algorithm.

27. The system of claim 25, wherein the signal processing unit is configured to select the active tap by solving an l1/l2 norm minimization problem.

28. The system of claim 18, wherein the signal processing unit is configured to select the active tap by applying a basis pursuit de-noising function associated with an l1-norm objective function to the reduced data set.

29. The system of claim 17, wherein at least one of the training signals is a sounding reference signal ("SRS") signal.

30. The system of claim 17, wherein at least one of the training signals is a demodulation reference signal ("DMRS") signal.

31. The system of claim 17, wherein the MIMO wireless network is a cloud radio access network ("C-RAN") network.

32. The system of claim 17, wherein the network operates using time division duplexed ("TDD") and frequency division duplexed ("FDD") communications.

33. The system of claim 17, wherein the signal processing unit is further configured to estimate the active tap using at least one of:
- l1-norm minimization;
- l2-norm minimization;
- regulated L2-norm immunization;
- OMP greedy matching pursuit; and
- stomp greedy matching pursuit.

34. A non-transitory computer readable medium storing a computer program, executable by a machine, for performing time domain channel estimation in a multi-user multiple input multiple output ("MIMO") wireless network, the computer program comprising executable instructions for:
- receiving data corresponding to transmission of training signals from a plurality of users to a base station over a MIMO wireless network;
- determining a limited data set by limiting the received data in a time domain according to an estimated maximum delay spread;
- forming a well-conditioned low rank training matrix by identifying a channel model;
- estimating an active tap from the formed well-conditioned low rank training matrix; and
- subtracting a contribution of the selected active tap from the limited data set.

* * * * *